United States Patent [19]

Corl

[11] Patent Number: 4,974,211
[45] Date of Patent: Nov. 27, 1990

[54] DIGITAL ULTRASOUND SYSTEM WITH DYNAMIC FOCUS

[75] Inventor: Paul D. Corl, Palo Alto, Calif.

[73] Assignee: Hewlett-Packard Company, Palo Alto, Calif.

[21] Appl. No.: 325,409

[22] Filed: Mar. 17, 1989

[51] Int. Cl.$^5$ .............................................. G03B 42/06
[52] U.S. Cl. ...................................... 367/7; 367/103; 73/626
[58] Field of Search ............... 367/122, 123, 119, 120, 367/7, 99, 103–105; 73/626, 628, 641

[56] References Cited

U.S. PATENT DOCUMENTS

| | | | |
|---|---|---|---|
| 4,149,419 | 4/1979 | Connell, Jr. et al. ............ | 73/626 X |
| 4,154,113 | 5/1979 | Engler .................................... | 73/626 |
| 4,173,007 | 10/1979 | McKeighen et al. .................. | 73/626 |
| 4,542,746 | 9/1985 | Takamizawa ..................... | 73/626 X |
| 4,543,829 | 10/1985 | Lerch .................................... | 73/626 |
| 4,796,236 | 1/1989 | Welles, II et al. ............. | 367/103 X |

Primary Examiner—Thomas H. Tarcza
Assistant Examiner—Tod R. Swann

[57] ABSTRACT

An ultrasound system for investigating a subject comprises a probe, a signal processing module, and an interconnecting cable. The probe includes an annular phased array transducer defining multiple signal processing channels. The signal processing module includes a controller, a transmitter, a receiver, delay circuitry, and a video section. Within the delay circuitry, each signal processing channel includes an inphase branch and a quadrature branch. Each branch includes an analog-to digital converter (ADC) and a delay first-in-first-out (FIFO) memory. Dynamically variable delays are implemented by varying the sampling and FIFO input rates relative to constant FIFO output rates. The variable clock rates are derived by switching between phase-staggered replicas of a master clock MCLK, which has a rate at the nominal center frequency of the ultrasound signal prior to sampling. The timing circuit used to derive the variable clock rate signal uses a focus FIFO to serve as a timing buffer between the variable clock rate signal and the master clock signal. Inphase data streams from each channel are combined in a pipelined adder; quadrature data streams are similarly combined. An interpolator permits accurate combinations of the summed inphase and quadrature data streams. The resulting combination is directed to the video section for output. Advantages of the disclosed system include low signal processing, memory and data rate requirements, resulting in a more reliable and economical high-performance ultrasound system.

5 Claims, 9 Drawing Sheets

DIGITAL ULTRASOUND SYSTEM WITH DYNAMIC FOCUS

BACKGROUND OF THE INVENTION

The present invention relates to medical instrumentation and, more particularly, to a digital ultrasound system for medical imaging. A primary objective of the present invention is to provide a high-resolution digital ultrasound system with modest memory and processing requirements.

A typical ultrasonic imaging system comprises an electronics module and a probe. The electronics module generates an electrical pulse which is converted to an ultrasonic pulse by a transducer in the probe. When the probe is pressed against a body, the ultrasonic pulse is transmitted into the body and is reflected to different degrees at tissue boundaries within the body. The reflections from the various tissue boundaries reach the transducer at different times, depending on their distances from the probe. The transducer converts the reflections to a time-varying electrical signal. This electrical signal is processed to form a video representation of the body being imaged.

Relatively simple ultrasound systems are known which employ spherical or parabolic transducers to transmit and receive ultrasound signals. Generally, these transducers are fixed focus in that their focal point is a fixed distance from the transducer. Provisions are typically made to steer the transducer to obtain image information over a range of angles. The resolution of the ultrasound image is limited by the aperture of the transducer, with larger apertures allowing greater resolution. However, larger apertures produce shallower depths of field so that a smaller range of depths to either side of the focal point can be imaged within a given tolerance of maximum resolution.

It is theoretically possible to provide both greater range and high resolution by deforming a transducer to vary its focal length so that a high resolution image is obtain for each of many focal depths. Apparently, it has not been practical to achieve the desired focal length control by mechanically deforming a transducer. On the other hand, "electronic deformation" of phased array transducers, a technology derived from radar, has permitted high-resolution imaging without significant depth-of-field limitations.

Phased array transducers comprise multiple transducer elements arranged in annular, linear or planar arrays. By varying time delays between elements of any array one can vary the depth of focus dynamically. Thus, a large aperture array transducer can be used to obtain high-resolution imaging and its depth of focus can be varied to overcome the limitation of a shallow depth of field.

Annular arrays come closest to simulating a mechanically deformable single-element spherical transducer. An annular array comprises multiple annular transducer elements arranged coaxially. As reflections are received by each of the annular elements, each annular element generates a corresponding electrical signal. By controlling the relative delays introduced in these electrical signals, the focal depth of the annular array transducer can be controlled. As with a spherical single-element transducer, an annular array must be mechanically steered to obtain a two-dimensional ultrasound image. Thus, an annular array involves a hybrid of mechanical and electronic control of the transducer focal point.

A linear phased array comprises a series of narrow elements arranged side-by-side. Such an array can be electronicallyu steered and focussed. A disadvantage of a linear phased array is poor azimuthal resolution in the direction perpendicular to the plane of the image. Planar array transducers comprise a multitude of small-aperture elements arranged in a two-dimensional array. As with linear array transducers, both focal depth and steering can be effected electronically. In fact, steering can be in two-dimensions. A major advantage of planar array transducers, when contrasted with linear array transducers is that they resolve in the azimuthal dimension. However, planar array transducers are not widely implemented due to the large number of separate signal channels, one for each transducer element, which must be processed.

Most ultrasound systems use analog processing to obtain video representations of the subject being imaged. However, as in other technological fields, several advantages are obtainable using digital processing. Once the signals are converted to digital format, they are less vulnerable to distortion, noise etc. In addition, digital systems are more amenable to automated testing and require few adjustments. Therefore, it is generally easier to manufacture reliable digital systems. Costs can be lowered through integration and flexibility can be provided through programming.

Digital ultrasonic imaging systems are disclosed in U.S. Pat. No. 4,290,310 to Anderson. These systems are all based on linear phased arrays, although the suggestion is made that the principles can be applied to other transducer configurations, including other phased array transducers. Each transmit/receive transducer or each transmit/receive transducer pair corresponds to a channel, with 32 or more channels being preferred to obtain practical resolution. Steering and focus are controlled as a function of relative delays between the channels. These relative delays are implemented by controlling the time between reading in and reading out reflection data from a analog memory device such as a serial analog memory (SAM) or a charge-coupled device (CCD), or a digital memory such as a first-in-first-out memory (FIFO). Analog-to-digital converters (ADCs) are used to convert the analog reflection signals to digital form before they are read into the FIFO memories. The output of the memory devices are combined by a summing circuit, the output of which is directed to a video detector, and thence to a display. A master controller synchronizes the ADCs, memories, summing circuit and video sweep to provide a coherent image of the subject being scanned.

A major disadvantage of the system disclosed by Anderson is that focus depth cannot be swept dynamically. Anderson controls focal depth by filling memory devices to achieve a desired delay and then creates an image at the corresponding focal depth. Each depth requires a refilling of the memories, introducing delays in the imaging process. In effect, Anderson uses zone focussing—relying on a relatively small aperture, rather than dynamic focus, to provide the required resolution throughout the range of depths represented by the zones.

Other disadvantages of these digital systems are basically cost and complexity, the latter impinging on reliability. Anderson required 32 channels of ultrasonic reflection information to be synchronized and processed in parallel. A high performance system using the same design principles would require more than 100 linear transducer elements and a corresponding number of signal processing channels. Each channel requires its own ADC and memory as well as ancillary components. The activity of each component in each channel must be synchronized with the transmitter and the video output section.

In addition, each of the components must be capable of handling data at high speeds. Ultrasound imaging frequencies typically range from 2–10 MHz. Sampling by the ADCs generally is over two and, preferably, about four times the maximum ultrasound frequency so that components should be rated from about 15 MHz to 40 MHz. Anderson discloses a 60 MHz master clock to produce component clocks of 15 MHz and 20 MHz. Component costs rise dramatically with maximum clock rate, so a premium must be paid for these high speed components. In addition, operation of the memories at high speeds lowers the range of delays that can be implemented using the components. Anderson combines memory devices serially to obtain longer delays, but this multiplies cost and complexity as well.

Furthermore, Anderson's implementation using linear arrays results in poor azimuthal resolution. This problem can be addressed by opting for two-dimensional arrays. However, this would greatly exacerbate the problems of component count, component, cost and system complexity. Several hundred channels would be required for practical resolution in a digital two-dimensional phased array system.

What is needed is an ultrasonic imaging system which provides the advantages of dynamic focus and digital control without the cost and complexity of previously disclosed systems. Preferably, high resolution in all three dimensions would be provided. Furthermore, the component clock ratings should be modest so that less costly components can be used and so that longer delays can be implemented without serially combining memory devices or using larger, more expensive memories.

SUMMARY OF THE INVENTION

The foregoing objectives are attained in an ultrasound system with a phased array transducer, preferably annular, in which delays are introduced using asynchronously driven FIFOs. Each transducer element defines a signal processing channel. Preferably, each channel includes an inphase branch and a quadrature branch to further reduce data rate requirements for the system. Each channel, and preferably each branch, includes an analog-to-digital converter (ADC) and a delay FIFO. The ADC samples the incoming signal to provide a digital counterpart. Relative delays are introduced by independently clocking the input and output for each delay FIFO. In an ultrasound system which has a bandwidth less than its nominal center frequency, each delay FIFO input can be operated at the same rate as the corresponding ADC, while all delay FIFO outputs are operated at a master clock rate which may also govern transmission rates, downstream combining of digital signals, and the video circuitry. The master clock rate is substantially at the nominal center frequency of the transmitted ultrasound signals, while the sampling rates vary within a few percent of that nominal center frequency.

Timing circuitry converts master clock signals to timing signals which can be varied precisely relative to the master clock which drives most of the ultrasound system circuitry. These timing signals are used to drive the ADCs and delay FIFO inputs asynchronously relative to the delay FIFO outputs which are governed by the master clock. The asynchronous relation between FIFO input and output timings permits dynamic control of the number of samples stored in each delay FIFO, and thus dynamic control of the delay introduced in each signal channel. Dynamic control of the delays introduced by all delay FIFOs permits focal length to be swept continuously. This permits the practical use of larger aperture transducers without sacrificing imaging speed or limiting focussing range to a fixed depth of field.

The asynchronous timing signals are derived by switching among multiple phases of the master clock. A phase shifter, which can be a digital shift register, can be used to generate the multiple clock phases which are provided as inputs to clock phase multiplexers. The multiplexers can be switched so that the output phase is controlled precisely. Successive phase shifts effect a frequency shift so that the multiplexer output is essentially asynchronous relative to the master clock. A program which determines when phase shifts are to be implemented is input synchronously into a focus FIFO of the timing circuitry. The focus FIFO output is operated according to the timing of the respective multiplexer output. Thus the focus FIFO output is operated asynchronously from the focus FIFO input. In this way, the focus FIFO serves as a timing buffer between the master clock and the asynchronous timing circuit. The asynchronous timing signals provided by the timing circuit for each channel are phase shifted so that inphase and quadrature replicas are produced. The inphase replica drives the ADC and delay FIFO input of the corresponding inphase branch and the quadrature replica drives the ADC and delay FIFO input for the corresponding quadrature branch.

The respectively delayed inphase data streams from each channel are combined, preferably in a pipelined adder. The respectively delayed quadrature streams are similarly combined. An interpolator circuit can be used to compensate for the timing difference between inphase and quadrature samplings; the inphase and quadrature data streams can then be combined and directed to the video circuitry which displays an image of the subject being analyzed by the ultrasound system.

This ultrasound system provides several advantages. Since the delays are digitally controlled, the resulting focussing is precise. Furthermore, the delays, and thus focussing, are dynamically variable, which helps produce clear images at high speed. The use of annular phased array transducers provides high resolution with the fewest channels, reducing processing requirements. For example, a twelve-channel annular phased array transducer can provide resolution comparable to a linear phased array with more than 100 channels. In addition, azimuthal resolution is not compromised. Implementing delays using variable controlled input rates permits a large focussing range per word of memory. Deriving sample rate and delay FIFO input signals by switching between multiple phases of a master clock greatly reduces switching rate requirements of the system circuitry. Further reductions are effected by using quadrature sampling, preferably, with separate inphase and quadrature branches for each channel. The reduced processing, memory and sample rate requirements result in a more economical, more reliable and higher performance ultrasound system. These and other features and advantages of the present invention are apparent from the description below with reference to the following drawings.

DESCRIPTION OF THE PREFERRED EMBODIMENTS

Figure 1:
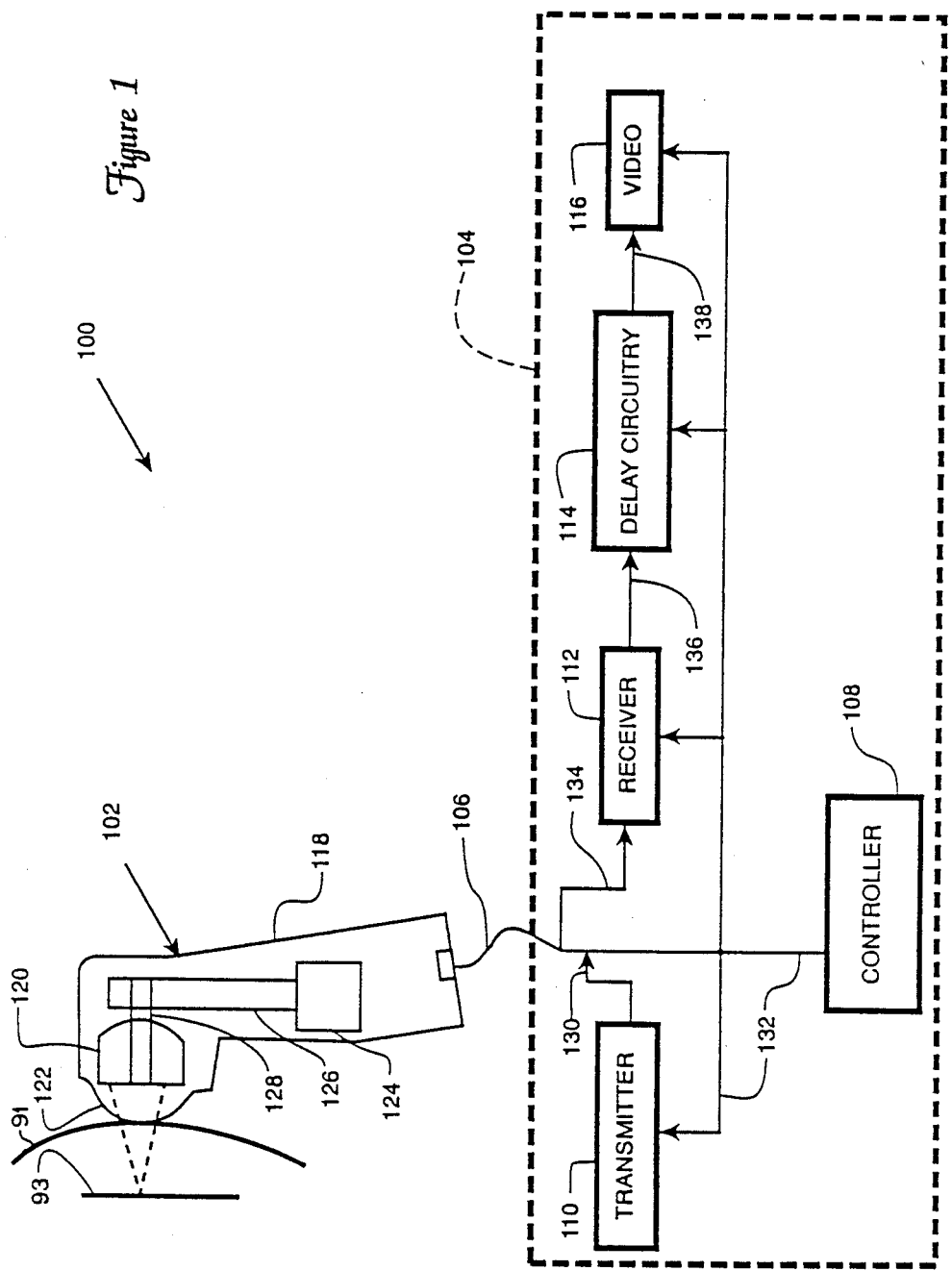
FIG. 1 is a schematic view of an ultrasound system in accordance with the present invention.
Figure 2:
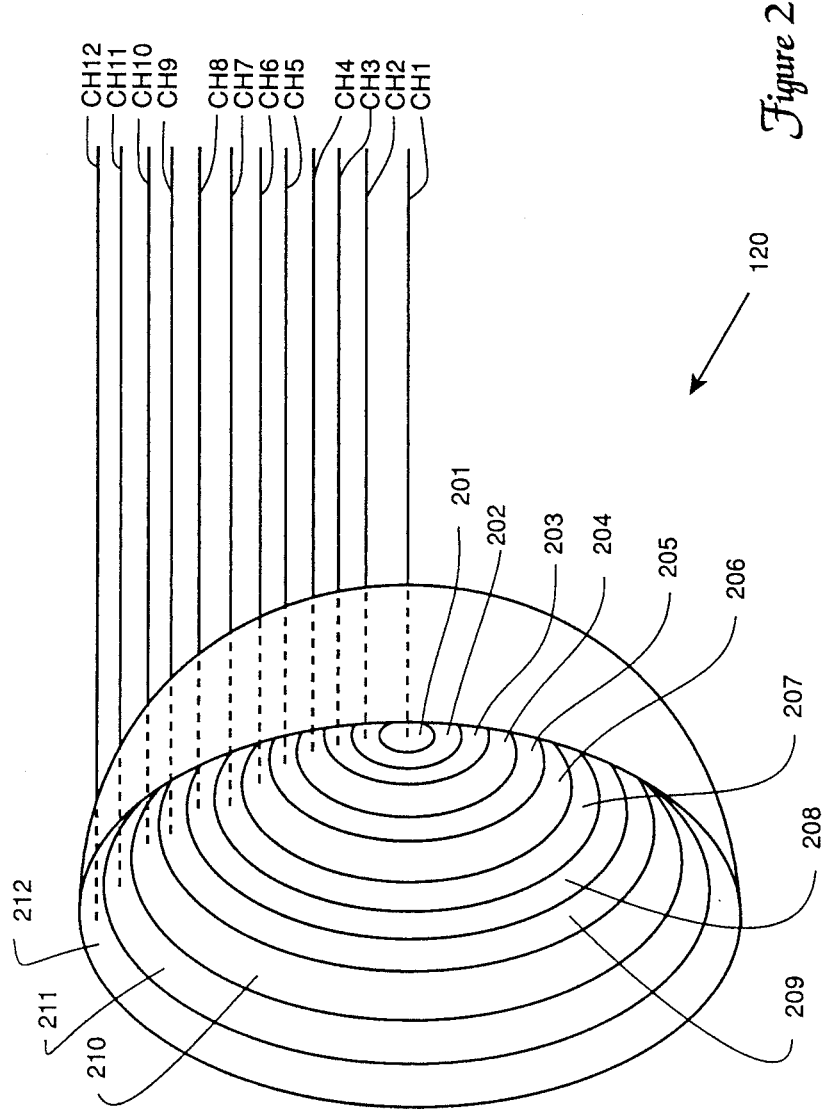
FIG. 2 is a schematic perspective view of a transducer of the ultrasound system of FIG. 1.

An ultrasound system 100 includes a probe 102 and a signal processing module 104 which are connected via a cable 106, as shown in FIG. 1. Signal processing module 104 comprises a controller 108, a transmitter 110, a receiver 112, delay circuitry 114, and a video section 116. Probe 102 includes a body 118, a transducer 120, a probe window 122, a motor 124, a motor shaft 126, and a drive belt 128. Transducer 120 includes twelve concentrically arranged annular transducer elements 201-212 configured to conform to a section of a sphere, as indicated in FIG. 2.

Each transducer element 201-212 defines a respective signal channel CH1-CH12. In operation, each channel CH1-CH12 receives a respective electrical pulse from transmitter 110 along a transmit bus 130 and cable 106. These pulses are initiated by a trigger signal from controller 108 and directed along a control bus 132 to transmitter 110. When all electrical pulses reach respective transducer elements 201-212 at the same time, the effective focal length of transducer 120 is its geometric focal length. Transmitter 110 also can introduce relative delays in pulses across channels CH1-CH12 to provide for selection of different focal zones. Delay circuitry 114 provides for dynamic focussing within each zone selected by transmitter 110.

Transducer 120 converts the transmit pulses to ultrasound pulses which are transmitted through probe window 122 and into a subject 91 being characterized by ultrasound. The transmitted ultrasound pulses partially reflect at tissue boundary 93 and other boundaries characterized by ultrasound impedance mismatches. Transducer 120 detects the resulting echoes as an ultrasound signal. More precisely, each transducer element 201-212 detects an ultrasound signal. Each detected ultrasound signal is in the form of time-varying ultrasonic energy. Each transducer element 201-212 converts the signal it detects into a respective electrical signal.

The twelve electrical signals generated by transducer elements 201-212 are transmitted along channels CH1-CH12 via cable 106 and a receiver bus 134 to receiver 112, which processes channels CH1-CH12 in parallel. Receiver 112 amplifies and time-gain compensates the electrical signals in each of the channels. Since each electrical signal is the result of multiple reflections of a single pulse, later portions of each signal represent reflections from deeper tissue boundaries. The greater depth correlates with greater attenuation. Time-gain compensation, i.e., amplification which increases over time, compensates for accumulated attenuation which increases as a function of time of detection. Controller 108 synchronizes time-gain compensation with the transmit pulses triggered via control bus 132.

The time-gain compensated signals are accepted by delay circuitry 114 from receiver 112 along delay bus 136. The purpose of delay circuitry 114 is to introduce dynamic, relative delays among signals in channels CH1-CH12 so as to sweep electronically the focal length of transducer 120. The range of this sweep extends over a zone as selected by delays introduced by transmitter 110. Successive sweeps over different transmit zones can be used to extend focussing range.

Video bus 138 conveys the output of delay circuitry 114 to video section 116. This output is a digital representation of the ultrasonic image of subject 91 with successive portions of the digital representation representing respective depths within a transmit zone. The process as described so far provides a one-dimensional image representing a vector within subject 91. A fan-shaped two-dimensional image is obtained by combining successively obtained one-dimensional images while steering transducer 120. Motor 124 is mechanically linked to transducer 120 via shaft 126 and drive belt 128 to effect steering. Controller 108 controls motor 124 via control bus 132 and cable 106 so that steering can be synchronized with video output.

Figure 3:
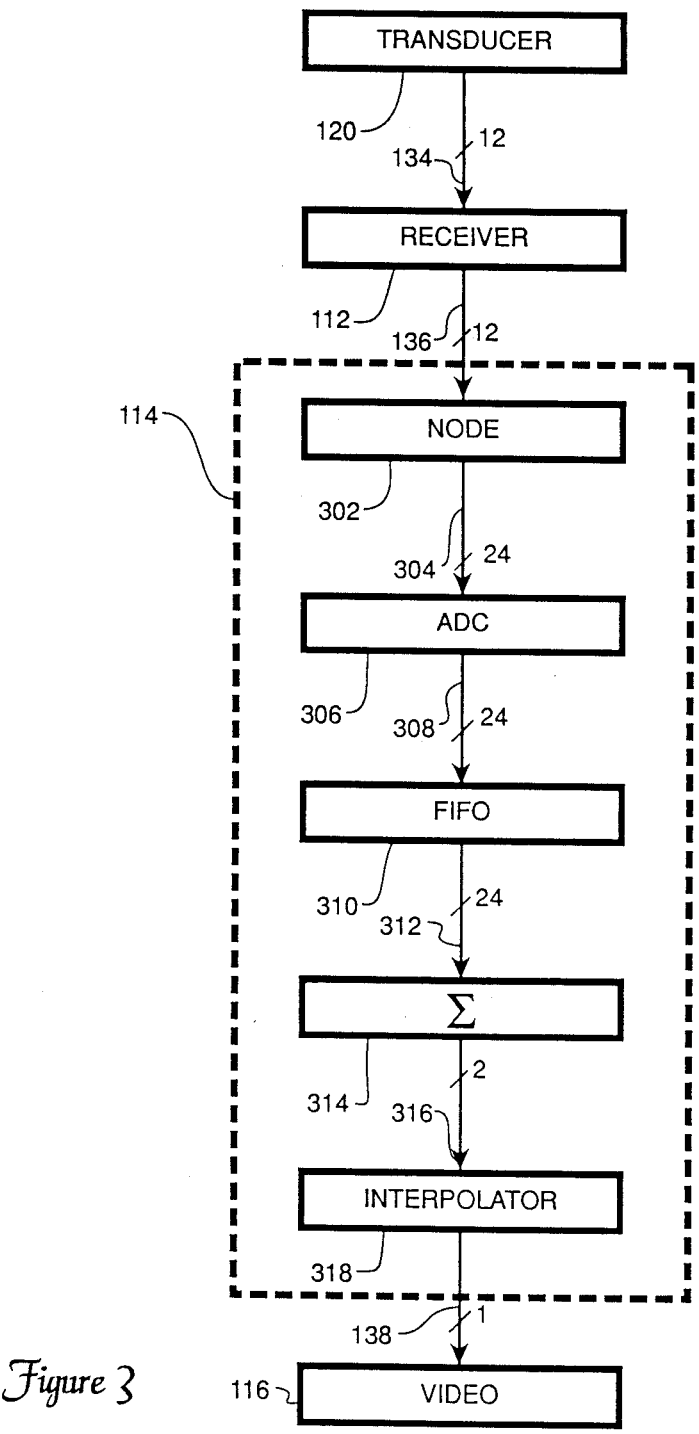
FIG. 3 is a block diagram of the ultrasound system of FIG. 1 showing the bus widths between components of the system and detailing stages of delay circuitry for the system. One- and two-digit numbers represent the number of analog or digital data paths.

Delay circuitry 114 is shown in greater detail in FIG. 3. As indicated, detected ultrasound signals are converted to twelve electrical signals which are directed to receiver 112 along receiver bus 134. The twelve amplified signals are conveyed along delay bus 136 to delay circuitry 114. Delay circuitry 114 includes a node bank 302 which splits each channel CH1-CH12 into two branches, i.e., inphase and quadrature branches, resulting in a 24-branch analog link 304 to ADC bank 306. ADC bank 306 digitizes the signals in each branch to provide twenty-four digital data streams along a 24-branch FIFO input link 308 to delay FIFO bank 310. The delays required for focussing are introduced at this delay FIFO bank 310, and the delayed digital data streams are conveyed along delay FIFO output link 312 to a piplelined adder 314. Pipelined adder 314 combines inphase data streams across channels and quadrature data streams across channels. It thus provides two digital data streams along interpolator link 316 to an interpolator 318. Actually, interpolator link 316 is a single data communications line with the inphase and quadrature streams being time-multiplexed thereon. The output of interpolator 318 is directed along video bus 138 to video section 116 for display.

Figure 4:
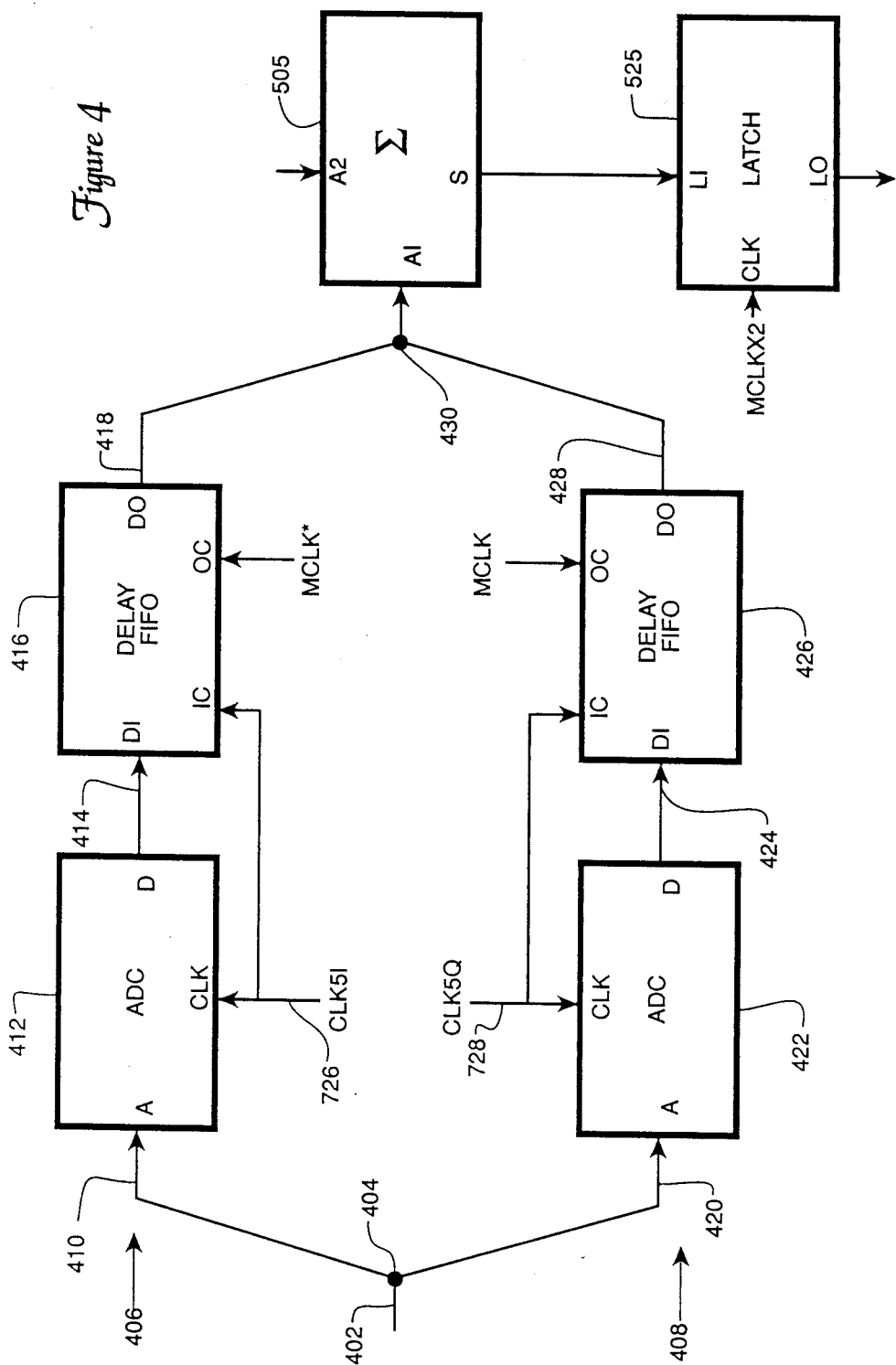
FIG. 4 is a block diagram depicting sampling and delay stages of the delay circuitry of FIG. 3.

The intersection of a channel CH5 with node bank 302, ADC bank 306, delay FIFO bank 310 and pipelined adder 314 is illustrated in FIG. 4. Line 402 is the channel CH5 signal line of delay bus 136. Node 404 is the channel CH5 node of node bank 302. The signal received along line 402 is divided into two replica signals to be processed by the inphase branch 406 of channel CH5 and the quadrature branch 408 of channel CH5, respectively.

Inphase branch 406 includes an inphase sample input line 410, an "inphase" analog-to-digital converter 412, an "inphase" FIFO input line 414, an "inphase" delay FIFO 416, and an inphase FIFO output line 418. Correspondingly, quadrature branch 408 of channel CH5 includes a quadrature sample input line 420, a "quadrature" analog-to-digital converter 422, a "quadrature" FIFO input line 424, a "quadrature" delay FIFO 426, and a quadrature FIFO output line 428.

FIGS. 3 and 4 are related as follows. Both sample input lines 410 and 420 are part of 24-line analog link 304. Inphase ADC 412 and quadrature ADC 422 belong to ADC bank 306; inphase FIFO input line 414 and quadrature FIFO input line 424 belong to 24-line FIFO input link 308; inphase delay FIFO 416 and quadrature delay FIFO 426 are part of FIFO bank 310, and inphase FIFO output line 418 and quadrature FIFO output line 428 belong to 24-line FIFO output link 312. Lines 418 and 428 are hardwired together at a node 430 at the input of an add gate 432. Add gate 432 and an associated latch 434 are elements of pipelined adder 314.

Despite their different labels, inphase sample input line 410 and quadrature sample input line 420 carry identical analog signals with negligible phase differential. The difference between the inphase and quadrature components arises from the different timing signals. Inphase ADC 412 samples the analog input at port A at a rate determined by a timing signal at its CLK port to yield an 8-bit digital output at its D port. Quadrature ADC 422 is functionally identical but is driven by a timing signal which lags the timing signal to inphase ADC by 90°. Inphase delay FIFO 416 inputs data received at its data-in port DI at a rate determined by a timing signal applied to its input clock port IC and outputs data on a first-in-first-out basis from its data-out port DO at a rate determined by a timing signal applied to its output-clock port OC. Quadrature delay FIFO 426 is functionally identical and is driven 90° out of phase relative to delay FIFO 416.

The delay FIFOs in FIFO bank 310, FIG. 3, are clocked out at the same rate, which is the master clock rate and the nominal center frequency of the ultrasound signals. The even-numbered inphase delay FIFO outputs and the odd-numbered quadrature delay FIFO outputs are in phase with each other and 180° out of phase with odd-numbered inphase delay FIFO outputs and even-numbered quadrature delay FIFO outputs. Specifically, the outputs of the even-numbered inphase delay FIFOs and of the odd-numbered quadrature FIFOs are driven by the master clock MCLK and the outputs of the odd-numbered inphase FIFOs and of all even-numbered quadrature FIFOs are driven by the complement MCLK* of master clock signal MCLK.

In contrast to the constant rate timing signals applied to the delay FIFO output clock ports OC, variable rate clocks are applied to the delay FIFO input clock ports IC as well as the to the clock ports CLK of the ADCs. For example, inphase ADC 412 and input port IC of inphase delay FIFO 416 are driven by a variable rate channel CH5 inphase timing signal CLK5I. Quadrature ADC 422 and input port IC of quadrature delay FIFO 426 are driven by a variable rate channel CH5 quadrature timing signal CLK5Q, which is derived from CLK5I by adding a 90° phase delay.

In operation, CLK5I is operated at an average rate above that of MCLK. This causes inphase delay FIFO 416 to fill, resulting in an increasing delay in the data stream through the inphase branch of channel CH5. For each channel, the sampling rate and the delay FIFO input rate is varied to effect an increasing depth of focus for transducer 120. Channel CH1 is an exception, its sampling rate can be at MCLK to serve as a reference for the relative delays introduced in the other channels CH2-CH12.

As indicated above, the output of inphase delay FIFO 416 is driven 180° out of phase with respect to the output of quadrature delay FIFO 426. In effect, these two FIFOs 416 and 426 take turns providing values to the input A1 of add gate 505. The value applied to input A1 is added to a value received at input A2 of add gate 505 and the result is directed to the latch input LI of latch 525 for storage therein. Latch 525 receives a clock signal MCLKX2 which operates at twice the rate of MCLK. The effect is that the contents of latch 525 alternate between inphase and quadrature sums.

Figure 5:
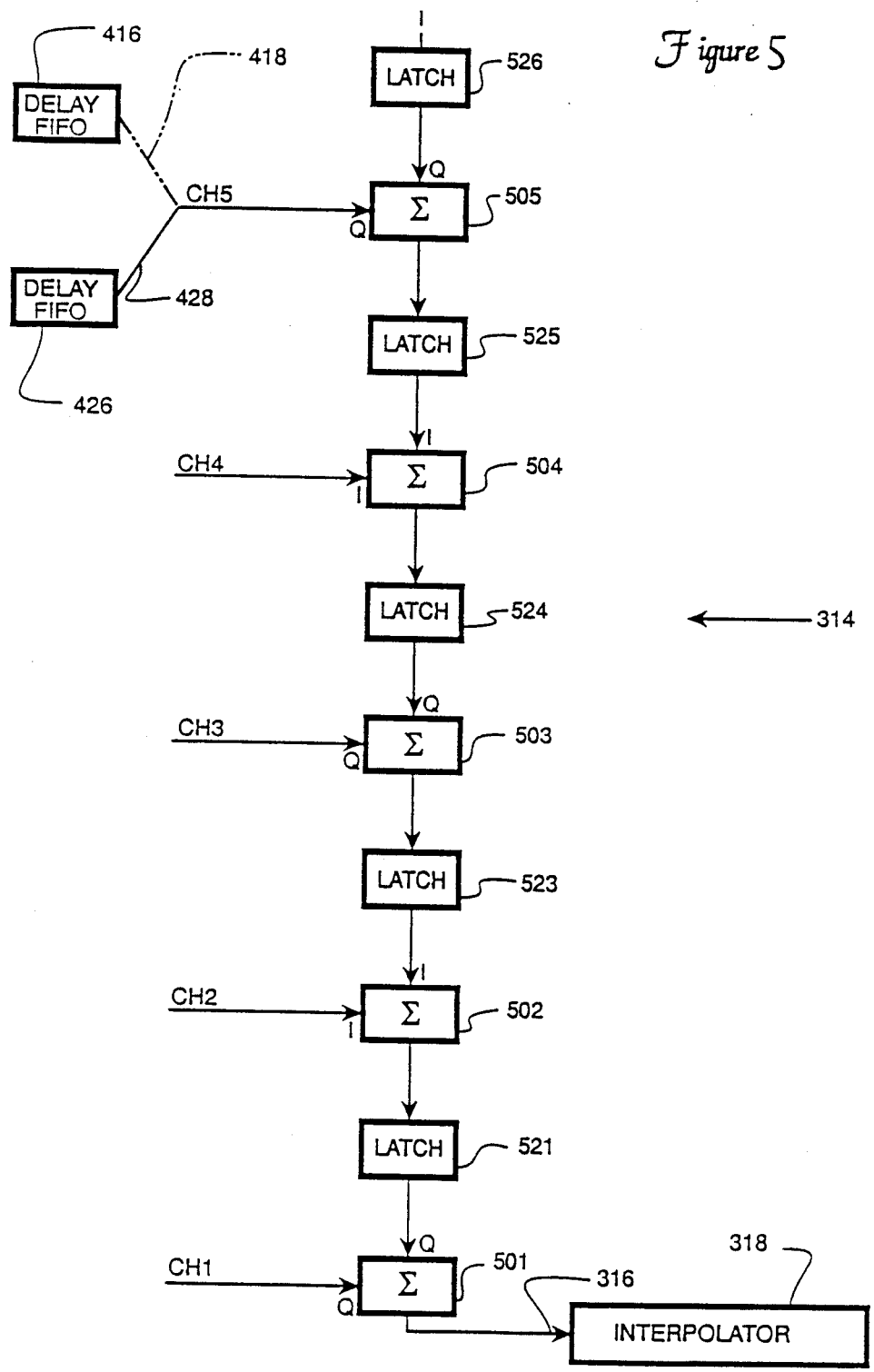
FIG. 5 is a block diagram of a pipelined adder used in the delay circuitry of FIG. 3. "I" and "Q" designations indicate whether inphase or quadrature data streams were the source of data being transferred along a particular line at the instant represented by FIG. 5.
Figure 6:
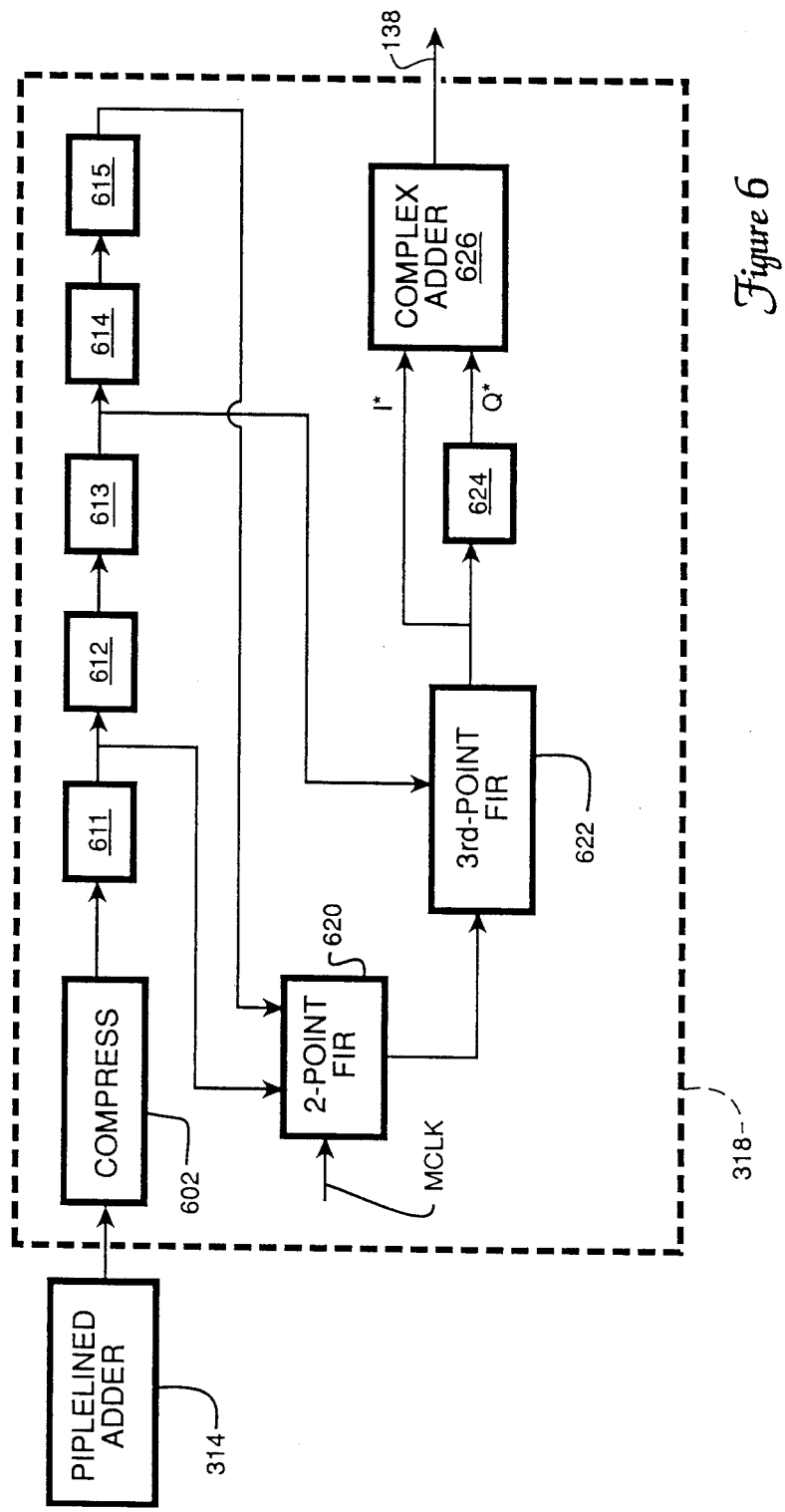
FIG. 6 is a block diagram of an interpolator used in the delay circuitry of FIG. 3.

The outputs from the different channels are combined by pipelined adder 314 as indicated in FIG. 5, which shows a portion of adder 314 at an arbitrary nth cycle of the master clock, with "I" representing inphase values and "Q" representing quadrature values. During this cycle, quadrature delay FIFO 426 is providing its quadrature output to add gate 505, while the output of inphase delay FIFO is disabled, as indicated by the broken line representing inphase delay FIFO output 418 in FIG. 5. The quadrature value from channel CH5 is added to a cumulative quadrature value from a latch 526 associated with channel CH6 and the sum is stored in latch 525 of channel CH5. In turn, the prior contents of channel CH5 latch 525, which reflected an inphase cumulative sum, are transmitted to channel four 224 adder 504 for addition with an inphase value being output from channel CH4. This result is stored in channel CH4 latch 524. In the same cycle, the present quadrature value from channel CH1 is directed to channel one add gate 501 for addition with the prior contents of channel CH2 latch 532. The result is the sum:

$$X_q = \sum_{m=1}^{12} Q^m_{n+1-m}$$

where m is the the channel number and n is the master clock cycle, and $Q_n^m$ is the quadrature value from channel CHm during the nth master clock cycle. On the next half master clock cycle the output of the pipelined adder will be:

$$X_i = \sum_{m=1}^{12} I^m_{n+1-m}$$

where $I_n^m$ is the inphase value from channel CHm during the nth clock cycle. Note that each channel provides two values, an inphase value and a quadrature value, during each clock cycle. Thus, the output of pipelined adder 314, which is directed along line 316 to interpolator 318, is an alternating series of 12-bit cumulative quadrature values $x_q$ and cumulative inphase values $x_i$.

The cumulative quadrature and inphase values must be recombined to provide a single data stream for use by video section 116. However, without additional processing, combination of the $x_i$ and $x_q$ values would introduce errors due to the difference in the timing of the I and Q samples. Interpolation can be used to derive values corresponding to the incoming analog signal between actual sample points. Thus, interpolation can be used to define I and Q values corresponding to coincident samples, rather than phase offset samples. This interpolation is performed by interpolator 318.

Interpolator 318 comprises a data compression ROM 602, a series of five latches 611-615, a 2-point finite impulse response (FIR) filter 620, a 3rd-point FIR filter 622, another latch 624, and a complex adder 626. Data compression ROM 602 receives the cumulative quadrature and inphase values output from pipelined adder 314. Compression ROM 602 is a look up table which converts the incoming twelve-bit values to six-bit values using a non-linear transformation to preserve the most significant information. The twelve incoming bits select an address which stores the square root of the address and the six most significant digits of the square root are output to the series of latches 611-615. Like pipelined adder 314, the interpolator components are clocked by MCLKX2. The exceptions are complex adder 626 and the associated latch 624, which are operated at the master clock rate.

At any given time, latches 511-515 store five successive output values from compression ROM 602. The first, middle, and last latches of this series will either store three successive quadrature values or store three successive inphase values. When all three hold compressed quadrature values, last latch 515 holds the first in a series of three such values, the middle latch 513 holds the middle of three successive values, and first latch 511 holds the third of three successive quadrature values. The outputs of the first and last latch are the inputs to 2-point FIR 620, which is a look-up table ROM. Thus the inputs to 2-point FIR 620 are the first and third points in a series of either three quadrature values or three inphase values. These values serve to select an address and the contents of the selected address represent the desired FIR transformation.

The required transformation depends on whether the values are quadrature or inphase values. Accordingly, 2-point FIR 620 includes two look-up tables. Alternation between these look-up tables is effected by the MCLK signal tied to a highest order address bit for 2-point FIR filter 620. The result of 2-point FIR filter 620 is combined with the second of the three intermediate values, which was stored in middle latch 513, at 3rd-point FIR 622.

The output of 3rd point FIR 622 is a series of alternating I* and Q* values with each pair representing coincident samples of the actual inphase and quadrature components of the signal. The interpolator minimizes the errors in these pairs of I* and Q* samples due to the time differences between inphase and quadrature samplings. Latch 624 is clocked to receive interpolated quadrature values. Complex adder 626 is clocked to receive interpolated inphase values at its first input I1 and interpolated quadrature values are received at its second input I2 via latch 624. Complex adder 626 thus combines the interpolated values to provide a unitary image intensity stream at its output. This image intensity stream is directed along line 138 to video section 116 for display.

Almost all clocked components in the channels are operated at the master clock rate or, in the case of pipelined adder 314 and some components of interpolator 318, at twice the master clock rate. The exceptions are the ADCs and the delay FIFO inputs. These are driven essentially asynchronously relative to the master clock. The portions of the timing circuitry required to provide the asynchronous timing signals for the ADCs and delay FIFOs of channel CH5 are shown as timing circuit 700 in FIG. 7.

Controller 108 is shown providing master clock signals MCLK to this timing circuit 700 which comprises a depth counter 702, a focus PROM 704, a focus FIFO 706, a phase counter 708, a phase multiplexer 710, and a phase shifter 712. Depth counter 702 simply counts master clock signals MCLK and outputs the count on a twelve-bit address bus 714 coupled to the address inputs AX of focus PROM 704. This focus PROM 704, which can comprise multiple PROMS in parallel, provides a twelve-bit output. The contents of each address of focus PROM 704 is a twelve-bit word containing timing information for all twelve channels CH1-CH12. For each count of depth counter 702, focus PROM 704 provides one bit of information to each channel. This information is used to affect the effective frequency of the ADC and delay FIFO input timing signals. Stored in focus PROM 704 are about 1000 bits of timing information for each channel. This timing information is a "program" governing delay as a function of time, i.e., the delay profile, for the channel.

For example, one output line 715 from focus PROM 704 is coupled to the channel CH5 focus FIFO 706. The other eleven output lines 716 from the focus PROM are coupled to respective focus FIFOs for the other channels. The input enable of focus FIFO 706 is connected to the controller for receiving master clock signal MCLK. Thus, focus PROM data is read into focus FIFO 706 at the master clock rate.

Data, in the form of a string of 0s and 1s is transmitted from focus FIFO 706 on a first-in-first-out basis to phase counter 708 along line 718. Phase counter 708 increments its stored value each time a 1 is received, while no increment is applied when a 0 is received. The three lowest order output bits of phase counter 708 are tied to three select inputs 3S of phase multiplexer 710 via select bus 720. In effect, phase counter is a modulo eight counter, recycling every eight 1s. In turn, the cycling of phase counter 708 cycles phase multiplexer 710 through eight possible switch positions.

Phase multiplexer 710 has eight data inputs 8D, all tied to controller 108. Controller 108 includes phase shifting circuitry for providing eight evenly staggered replicas of master clock MCLK. In other words, eight-bit-wide clock bus 724 carries MCLK, MCLK+45°, MCLK+90°, MCLK+135°, MCLK+180° which is MCKL*, MCLK*+45°, MCLK*+90°, and MCLK*+135°, shown in FIG. 8. Each time phase counter 708 increments, phase multiplexer 710 switches from one input to one leading that input by 45°.

Figure 8:
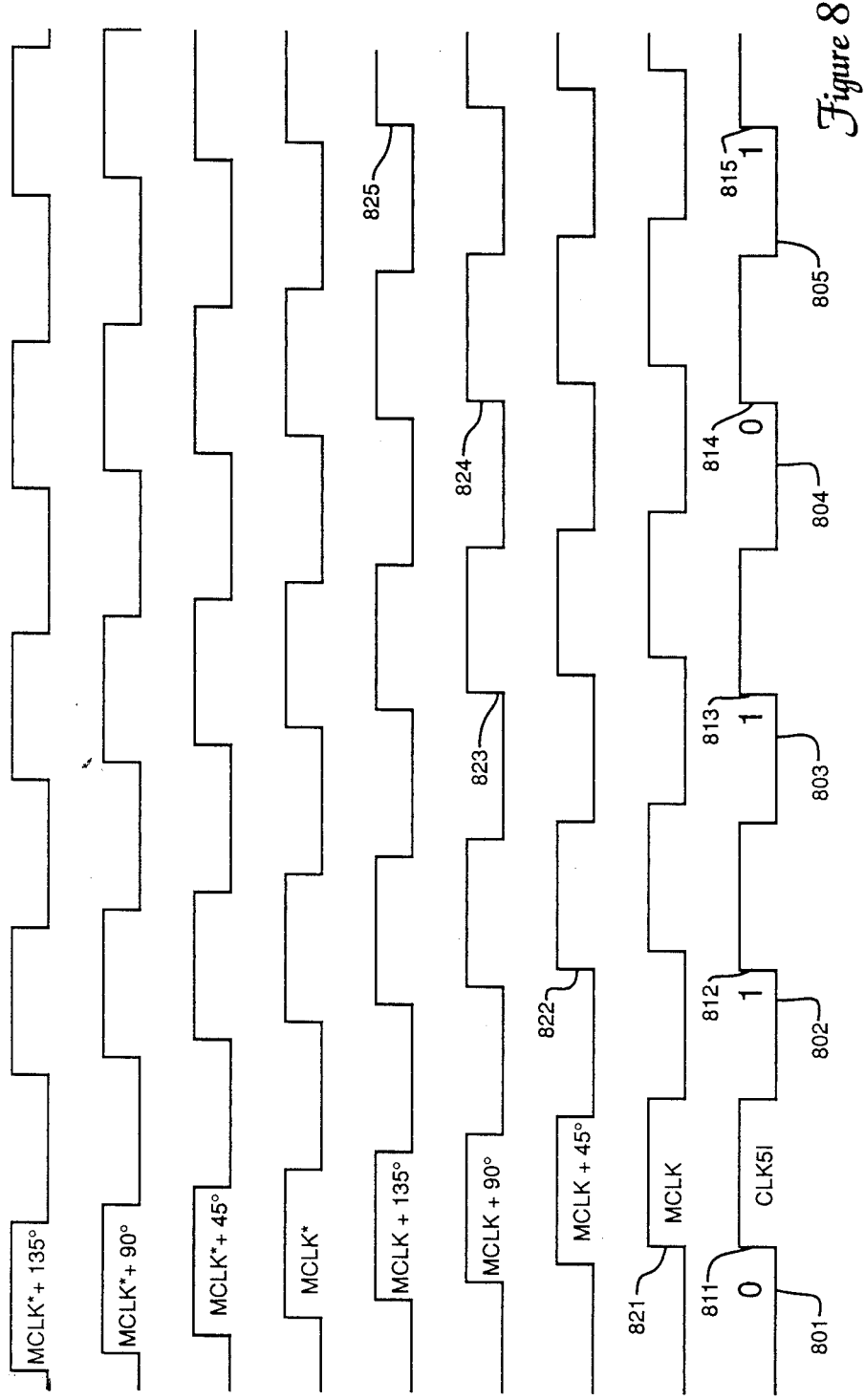
FIG. 8 is a timing diagram showing multiple phases of a master clock of the ultrasound system of FIG. 1 and the output of the timing circuit of FIG. 7.

By way of example, the inphase timing signal CLK5I for channel CH5, which is the same as the output of phase multiplexer 710, is shown in FIG. 8 initially inphase with MCLK. Specifically, CLK5I is in-phase with MCLK during a first cycle 801 so that a first positive transition 811 of CLK5I is concurrent with a positive transition 821 of MCLK. A first 1 received from focus PROM 704 during a second cycle 802 of CLK5I causes phase multiplexer 710 to select MCLK+45° so that a second positive transition 812 of CLK5I is concurrent with a positive transition 822 of MCLK+45°. A second 1, received during cycle 803, causes phase multiplexer 710 to advance to MCLK+90° so that positive transition 813 is concurrent with a positive transition 823 of MCLK+90°. A 0 is received during a fourth cycle 804 of CLK5I so that phase multiplexer 710 does not advance; as a result, positive transition 814 of CLK5I is concurrent with a second positive transition 824 of MCLK+90°. A third 1, received during fifth cycle 805, causes fifth positive transition 815 to be concurrent with a positive transition 825 of MCLK+135°.

The next 1 (not represented in FIG. 8) received places CLK5I in-phase with MCLK*. Four more 1s return CLK5I to an in-phase relationship with MCLK. However, at this time, CLK5I would have progressed through one more cycle than MCLK. In effect, CLK5I has a higher frequency than MCLK. The degree to which the frequency of CLK5I exceeds that of MCLK is a function of the ratio of 1s to 0s in the data stream through focus FIFO 706. Thus, where MCLK is 5 MHz, CLK5I has an average frequency of 5.42 MHz for the illustrated duration. A string of all 1s would yield a frequency of 5.63 MHz. Thus, the present scheme allows CLK5I to vary from between about 5 MHz to 5.63 MHz, or from a nominal frequency to 12.5% above that. In an alternative embodiment using two focus data streams for each channel and an up-/down counter, the sample timing signals for each channel could be dynamically varied 12.5% to either side of MCLK.

Figure 7:
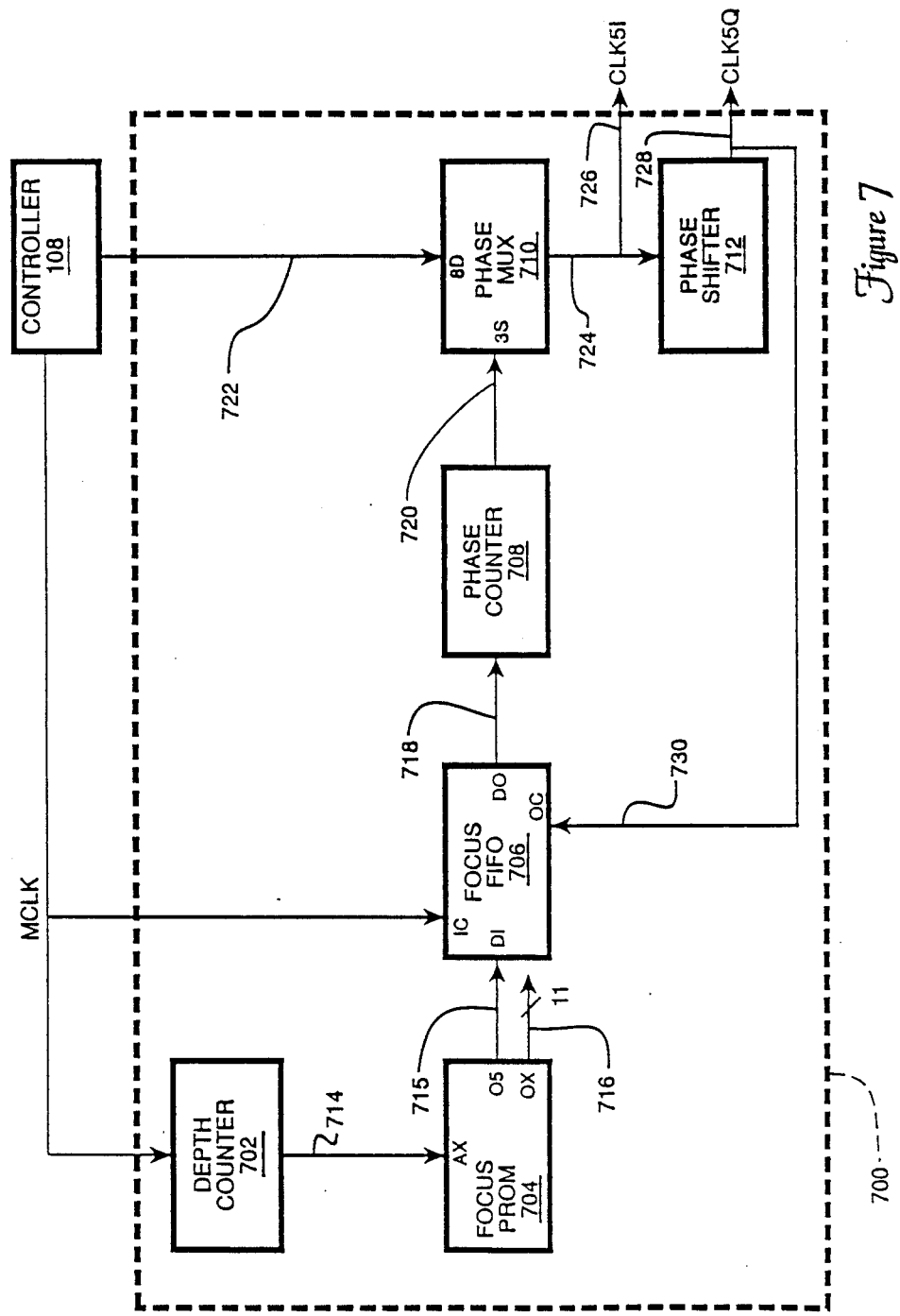
FIG. 7 is a block diagram of the timing circuit for the delay circuitry of FIG. 3.

The phase multiplexer output CLK5I is directed along line 726, FIG. 7, to govern the sampling rate of inphase ADC 412 and the input clock IC for inphase delay FIFO 416. Phase shifter 712 produces a replica of CLK5I which is delayed by one-quarter cycle to produce CLK5Q which is directed along line 728 to drive quadrature ADC 422 and the input of quadrature delay FIFO 426. CLK5Q is also directed along line 730 to the output clock OC of focus FIFO 706. This ensures that phase multiplexer switching is appropriately synchronized with variable timing signals. In effect, focus FIFO 706 acts as a timing buffer between the external circuitry governed by MCLK and the timing circuit for channel CH5 which is operated at the variable clock rate corresponding to CLK5Q.

From the foregoing, it should be apparent that while CLK5I and CLK5Q are derived from MCLK, their common rate can vary independently of MCLK. In this sense, they are asynchronous relative to MCLK. As described, timing circuit 700 only allows for advancing CLK5I relative to MCLK. However, by providing two data lines and parallel focus FIFOs, and using an up-/down phase counter, CLK5I can be made to vary above and below MCLK as required.

Each channel includes a timing circuit essentially like timing circuit 700 for channel CH5. In operation, the differences between the channels arise from the programs stored in focus PROM 704. For example, channel CH1 may have all 0s in its program so that channel CH1 operates at MCLK. The remaining channels are delayed relative to channel CH1 to effect the desired focus sweep. Of course, any channel could serve as the reference channel in place of channel CH1. It should also be clear that a timing circuit is not required for a reference channel governed solely by master clock MCLK. However, ultrasound system 100 incorporates timing circuits for all channels to maximize programming flexibility.

Figure 9:
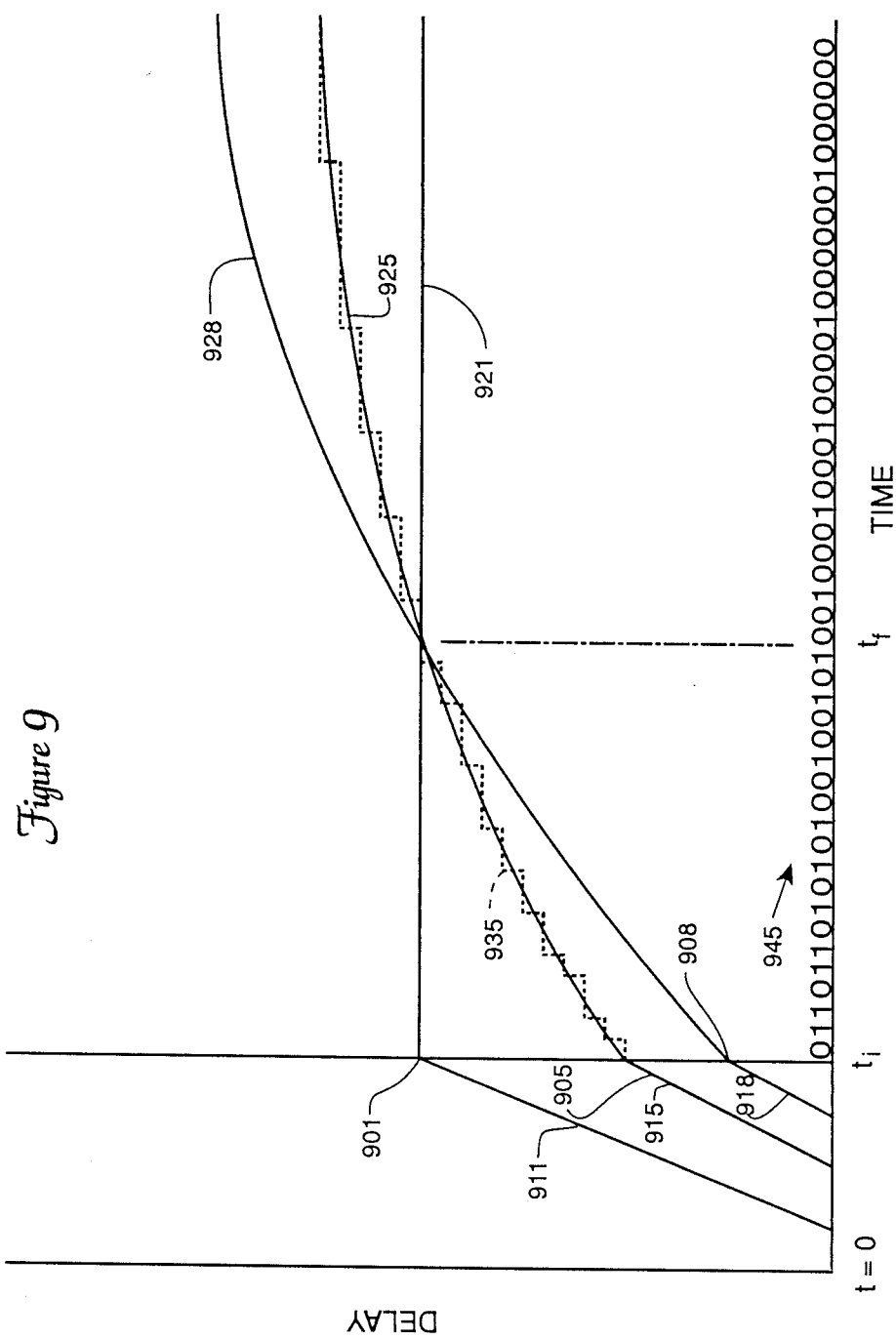
FIG. 9 is a graph illustrating a dynamic focus sweep strategy employed by the present invention.

The contents of focus PROM can be determined by working backward from delay curves, such as those illustrated in FIG. 9. Curves 901, 905 and 908 correspond to channels CH1, CH5 and CH8, by way of example. Channel CH1 corresponds to central annular element 201 of transducer 120. Each curve 901, 905 and 908 includes an initialization segment 911, 915, 918, respectively, ending at $t_i$, and an operational segment, beginning at $t_i$, and an operational segment 921, 925, 928, respectively, beginning at $t_i$. Operational segment 921 indicates a constant delay for channel CH1, which is used as the reference for the other channels. Operational segment 925 for channel CH5 begins with a delay shorter than that assigned to channel CH1 and ends with a greater delay. This corresponds to a depth sweep which begins with a near focus and ends with a far focus. Operational segment 925 intersects operational segment 921 at a point corresponding to the geometric focus for transducer 120. Operational segment 928 is similar to operational segment 925; since transducer element 208 is further from element 201 than is element 205, operational segment 928 is more accentuated than operational segment 925. The delays associated with the different channels are coordinated so that at all times they share a common focus. At time $t_f$, all channels share the geometric focus for transducer 120.

Dynamic digital delay requires digital approximation of the delay curves. A step function 935 is shown approximating operational segment 925 for channel CH5. Step function 935 is obtained by dividing operational segment 925 into subsegments corresponding to master clock cycles. Step function 935, like the step functions for the other channels, is constant during master clock cycles and during some transitions between master clock cycles. However, transitions to the next higher level are introduced as necessary to approximate operational segment 925. Step function 935 can be encoded as shown in data stream 945 which has zeroes corresponding to clock cycles without transitions and ones corresponding to transitions. This data stream 945 is stored in the appropriate column of the focus FIFO and is read out as the depth counter is incremented. The effect on CLK5I of first five bits, e.g., 01101, of digital stream 945 have been discussed with reference to FIG. 8 above.

At time $t_i$, the delay FIFO corresponding to channel CH1 is half full and is maintained at that level. This level is achieved by filling the channel CH1 delay FIFO while its output is disabled and enabling the output once the delay FIFOs for channel CH1 are half full. The first column of the focus PROM is correspondingly all zeroes. Increasing delays are introduced in the remaining channels. Therefore it is preferable that the corresponding delay FIFOs begin less than half full, as is indicated for channels CH5 and CH8 at time $t_i$ for delay curves 905 and 908. Again, the desired initial FIFO levels are set by filling the FIFOs with the output disabled and enabling the outputs at time $t_i$.

The present invention provides for many alternatives to the embodiments described above. Different strategies can be used to generate the data streams for the channels. In fact, the data streams could be reprogrammable, and where appropriate feedback is available, real-time reprogrammability could provide for a closed-loop ultrasound tracking system. Different clock rates, component counts, transducer geometries, and signal processing techniques are provided for. These and other modifications to and variations upon the described embodiments are provided for by the present invention, the scope of which is limited only by the following claims.

I claim:

1. An ultrasound instrument for characterizing a subject, said instrument comprising:

an annular phased array transducer having multiple annular elements, each of said annular elements being adapted for converting electrical pulses to ultrasonic pulses and ultrasonic echoes to electrical signals, said transducer being associated with multiple signal channels, each of said annular elements defining a respective one of said multiple signal channels;

motor means for steering said transducer, said motor means being mechanically coupled to said transducer;

transmitter means for providing a synchronized set of pulses, each pulse being directed along a respective one of said channels to a respective one of said annular elements;

receiver means for receiving and amplifying electrical signals and for generating respective receiver signals, each electrical signal being received along a respective one of said channels from a respective one of said annular elements;

node means connected to an output of said receiver means for splitting each of said receiver signals into two substantially identical node signals;

sampling means including at least an associated pair of samplers, one sampler thereof being coupled to receive one of the two node signals while the other sampler thereof being coupled to receive the other node signal, said associated pair having sampling rates which are different in phase from one another, said sampling means arranged for providing inphase and quadrature samples of signals in each of said channels so that each channel has a respective inphase data stream and a respective quadrature data stream;

memory means for providing relative delays between said channels in said inphase and quadrature data streams, said memory means including at least a corresponding pair of first-in-first-out memories, each of said memories having independent input enable means and output enable means, said memory means being arranged so that one of said corresponding pair receives as an input said inphase data stream and the other of said corresponding pair receiver as an input said quadrature data stream;

variable timing means for converting a constant timing signal into a variable timing signal used for controlling said sampling means and the input enable means of said memories, said variable timing means including a program for coordinating timing variations, among said channels to effect dynamically varying relative delays in said channels corresponding to a sweep of the focal point of said transducer over a range of depths in the subject;

summation means for combining said data streams into an image intensity stream, said summation means being coupled to the output of each of said memories;

video means for converting said image intensity stream into an image characterizing said subject;

controller means for coordinating the operation of the foregoing elements, said controller means being coupled to said motor means for controlling the steering thereof, said controller means being coupled to and providing timing signals for synchronizing said transmitter means, said receiver means, said output enable means of said memories, said variable timing means, said summation means and said video means, said controller means providing said synchronization so that said data streams are transmitted to said summation means at a constant rate and so that at least some of said data streams are clocked into said memories at a variable rate as determined by said program of said variable timing means.

2. The instrument of claim 1 wherein said transmitter means, said transducer means and said receiver means are mutually adapted for transmitting and receiving signals characterized by a nominal center frequency and a nominal bandwidth, said nominal center frequency being greater than said nominal bandwidth, each channel including an inphase branch for conveying said inphase data stream and a quadrature branch for conveying said quadrature data stream, said sampling means including plural analog-to-digital converters so that each branch includes a respective one of said analog-to-digital converters, each branch also including a respective one of said memories, each of said inphase and quadrature data streams being output from respective ones of said memories substantially at said nominal center frequency.

3. The instrument of claim 2 wherein said controller means and timing means cooperate to generate and select among multiple phases of a master clock generated by said controller substantially at said nominal center frequency so as to effectively vary the timing provided by said timing means to said sampling means and said input enable means of said memories.

4. The instrument of claim 3 wherein said timing means includes focus data means for generating focus data streams for said channels as determined by said program at the rate of said master clock, said timing means including a first-in-first-out focus memory for each channel for receiving and outputting a respective one of said focus data streams, each said focus memory having a respective focus input enable means coupled to said controller means so as to be clocked at the rate of said master clock, said timing means including a multiplexer for each channel, each multiplexer having data inputs coupled to receive said multiple phases of said master clock, each multiplexer having an output for transmitting a selected one of said phases, each multiplexer having select inputs coupled to the respective of said memory means for selecting which of said multiple phases is to be transmitted from the respective output of the respective multiplexer, the respective output of each multiplexer being coupled to respective phase shifter means so that a respective inphase signal is provided to the analog-to-digital converter and the memory of the inphase branch of the respective channel, and so that a respective quadrature signal is provided to the analog-to-digital converter and memory of the inphase branch of the respective channel so that the input rate for each of said memories can vary relative to its output rate.

5. A dynamically variable digital delay device comprising:

a signal source for providing a signal;

sampling means for providing a digital representation of said signal, said sampling means having a signal input for receiving said signal, a digital output for transmitting said digital representation, and a control input for receiving a sample rate signal for controlling the timing used to generate said digital representation and thus the output rate of said digital representation;

a delay FIFO having a data input, a data output, an input enable port and an output enable port, said data input being coupled to said source for receiving said digital representation from said source;

controller means for providing a master clock signal having a constant master clock rate, said controller means being coupled to said output enable port of said delay FIFO so that said digital representation is transmitted from said data output as said master clock rate, said controller means providing multiple phases of said master clock rate;

a multiplexer having signal input, a signal output and select inputs, said signal inputs being coupled to respective ones of said multiple phases so that one of said multiple phases can be selected for transmission from said signal output, said signal output being coupled to said control input of said sampling means for providing said sample rate signal thereto, said signal output also being coupled to said input enable port of said delay FIFO so that said sample rate signal also controls the rate at which said digital representation is input into said delay FIFO, said sample rate signal being characterized by a variable sample rate;

a timing data generator for generating a digital delay data stream, said timing data generator having an output enable port coupled to said controller so that said digital delay data stream is characterized by said master clock rate;

a timing FIFO having a timing data input, a timing data output, an input enable port and an output enable port, said timing data input being coupled to said timing data generator for receiving said digital delay data stream therefrom, said input enable port of said timing FIFO being coupled to said controller means so that said digital delay stream is input into said timing FIFO as said master clock rate, said output enable port of said timing FIFO being coupled to said signal output of said multiplexer; and phase selector means for providing a select output which varies as a function of said digital delay data stream, said phase selector means being coupled to said timing data output of said timing FIFO for receiving said digital delay data stream therefrom, said phase selector means being coupled to said multiplexer for providing said select output thereto so that said digital delay data stream determines which one of said multiple phases is selected at any given time so that said sample rate can be adjusted by progressive phase changes as dictated by said digital delay data stream;

whereby, said sampling rate can be varied relative to said master clock rate so that said digital representation can be input to said delay FIFO at a sampling rate which is dynamically variable relative to said master clock rate at which said digital representation is transmitted from said delay FIFO, said timing FIFO serving as a timing buffer between said master clock rate and said sampling rate.

* * * * *